A. A. EWALD.
YIELDABLE GEARING.
APPLICATION FILED MAY 31, 1910.
988,182.
Patented Mar. 28, 1911.
2 SHEETS—SHEET 1.
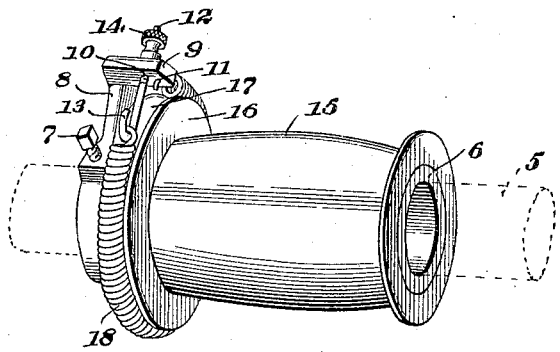
Fig. 1.
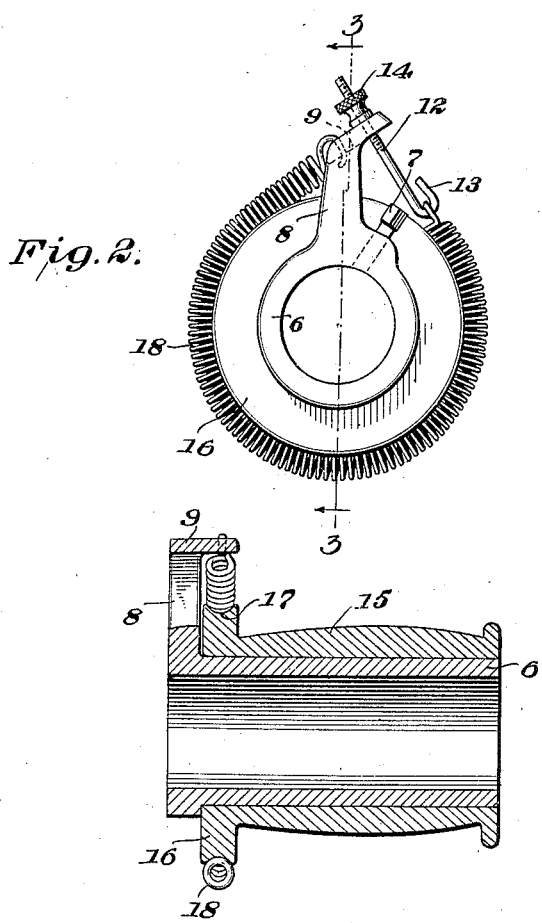
Fig. 2.
Fig. 3.
Witnesses
J. Adolph Bishop
C. H. Griesbauer
Inventor
A. A. Ewald,
by H. B. Willson &co
Attorneys

A. A. EWALD.
YIELDABLE GEARING.
APPLICATION FILED MAY 31, 1910.

988,182.

Patented Mar. 28, 1911.
2 SHEETS—SHEET 2.

Witnesses

Inventor
A. A. Ewald
by  Attorneys

UNITED STATES PATENT OFFICE.

ARNO A. EWALD, OF OAKFIELD, WISCONSIN.

YIELDABLE GEARING.

988,182.  Specification of Letters Patent. Patented Mar. 28, 1911.

Application filed May 31, 1910. Serial No. 564,203.

*To all whom it may concern:*

Be it known that I, ARNO A. EWALD, a citizen of the United States, residing at Oakfield, in the county of Fond du Lac and State of Wisconsin, have invented certain new and useful Improvements in Yieldable Gearing; and I do declare the following to be a full, clear, and exact description of the invention, such as will enable others skilled in the art to which it appertains to make and use the same.

This invention relates to yieldable gearing, and is especially adapted for use with driving mechanisms for cream separators and like machines.

One object of my invention is to provide a simple, efficient and inexpensive transmission device for actuating machines of this character.

Another object of my invention is to provide a gearing which will drive a machine of this character smoothly and easily and will absorb all jerks or sudden movements of the driving shaft when the engine or motor is started.

With the foregoing and other objects in view, the invention consists of certain novel features of construction, combination and arrangement of parts as will be more fully described and particularly pointed out in the appended claims.

Figure 4:
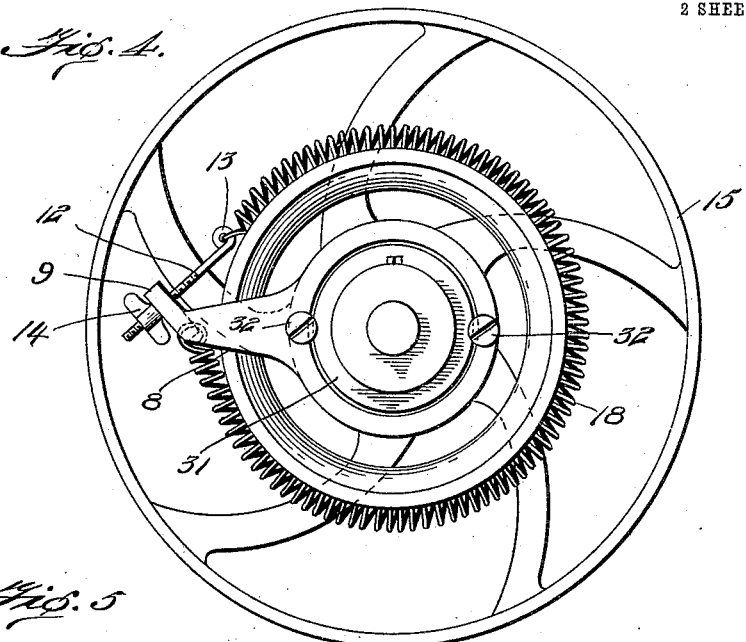
Figure 5:
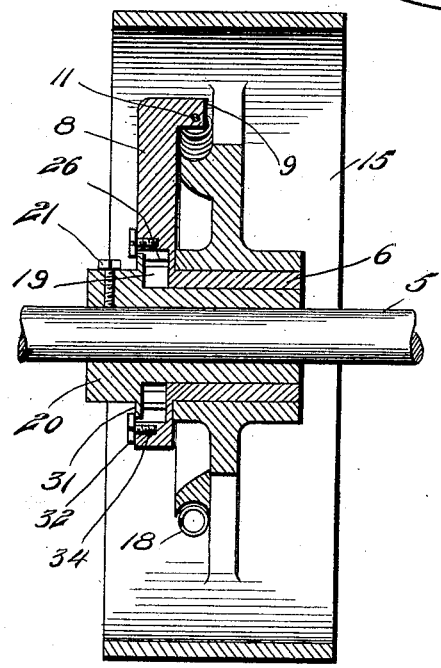
Figure 6:
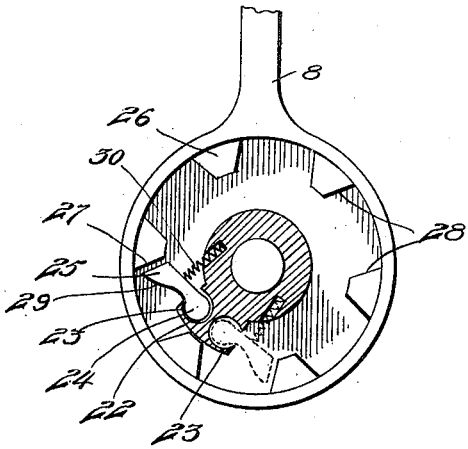

In the accompanying drawings, Figure 1 is a perspective view of my improved gearing. Fig. 2 is an end elevation of the same. Fig. 3 is a cross section taken on the line 3—3 of Fig. 2. Fig. 4 is a side elevation of a pulley equipped with an intermediate pawl and ratchet clutch. Fig. 5 is a central sectional view of the same; and Fig. 6 is a detail elevation of the clutch mechanism.

Referring particularly to the accompanying drawings, 5 designates a driving or power shaft, and 6 a sleeve suitably fixed thereon as by the set screw 7. The sleeve 6 is provided at one end with a radially extending arm 8 having a tongue 9 extending inwardly therefrom, said tongue being provided with suitable apertures 10 and 11 therein, for purposes to be hereinafter set forth. Extending through one of said apertures, as 10, is an adjusting device, herein shown as a bolt 12 provided with a hook or eye 13 at one end and threaded at its opposite end to receive an adjusting nut 14.

A pulley 15 is loosely mounted upon the sleeve portion 6, and adjacent one end of its hub is provided with a flange 16 having a peripheral groove 17 therein for the reception of a coil spring 18, which embraces said flange. One end of the coil spring 18 is secured to the radial arm 8 through the aperture 11 and its opposite end, after passing around the flange 16, is suitably secured to the hook or eye 13 of the adjusting bolt 12.

It will be apparent from the foregoing description that the only connection between the rotating hub or sleeve 6 and the pulley is through the coil spring 18, and said coil spring may be put under tension to grip the pulley with a greater or less degree of friction.

In practice, the spring is tightly stretched to grip the periphery of the flange 16 by means of the adjusting bolt 12 mounted in the radial arm 8 of the sleeve portion 6, and the rotation of the driving shaft 5 is directly communicated by the sleeve to the pulley 15, while the resiliency of the coil spring 18 serves to absorb all jerks and sudden movements of the driving shaft, the spring slipping or sliding within the peripheral groove of the flange without communicating the sudden movements to the pulley.

In Figs. 4 to 6, the pulley 15 is revolubly mounted around the sleeve 6, which sleeve is preferably provided with an annular recess 19 surrounding an intermediate hub or core 20, suitably secured upon the drive shaft 5, as by the set screw 21. Projecting radially in said hub or core 20, and adapted to extend within the recess 19 in the sleeve 6, is a lug 22 provided with oppositely disposed openings 23 for the reception of the head 24 of a pawl 25 adapted to coöperate with the inwardly extending radial teeth or lugs 26 carried by the sleeve 6. As herein shown, the pawl 25 is constructed with a flat face 27 adapted to operatively engage the inclined faces 28 of the radial teeth 26 to rotate the sleeve 6 in the direction desired, and a rounded back portion 29 adapted to contact with the teeth 26 to depress the pawl when the hub or core 20 is rotated in the reverse direction. A suitable spring 30 is positioned to normally hold the pawl 25 in its outermost position. The head 24 of the pawl 25 is preferably loosely mounted within one of the openings 23 in the lug 22 and may be readily detached or removed therefrom and replaced in the same or another of said openings as desired to rotate the pulley 15 in either direction.

In order to prevent accidental lateral movement of the sleeve 6 upon the hub or core 20, the hub 20 is preferably provided with an annular flange 31 adapted to rotate between the outer face of the sleeve 6 and the heads 32 of the headed screws or bolts 34 extending from the sleeve 6 at suitable intervals.

When it is desired to rotate the pulley 15 through the intermediate mechanism hereinbefore described, the drive shaft 5 is revolved rotating the hub or core 20 and the pawl 25 carried thereby, the flat face 27 of said pawl contacting with the inclined face 28 of one of the inwardly extending teeth 26 carried by the sleeve 6, thereby rotating the sleeve 6 in the same direction as the drive shaft 5. The rotation of the sleeve 6 through the tension spring 18 serves to rotate the pulley 15 in the manner hereinabove described. It will be apparent that should the drive shaft be irregularly driven or at any time be subject to jerks or sudden movements, the spring 18 will suffice to take up the same before they are communicated to the pulley 15, which will thereby be enabled to continue its rotation with a smooth and even motion. Should the drive shaft 5 be accidentally or temporarily driven in the reverse direction, the rounded back portion 29 of the pawl 25 will contact with the teeth 26 and be pressed inwardly out of engagement with the inclined faces 28 of the teeth or lugs 26, allowing the hub or core 20 to rotate without affecting the movement of the sleeve 6 or the pulley 15.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having described my invention, I claim:

1. The combination of a drive shaft, a sleeve adapted to be rotated thereby and provided with a radially-extending arm, a pulley loosely mounted upon said sleeve, and a spring arranged to grip said pulley and having its ends secured to said arm.

2. The combination of a drive shaft, a sleeve adapted to be rotated thereby and provided with a radial arm, a pulley loosely mounted on said sleeve, an adjusting device carried by said arm, and a spring arranged to grip said pulley having one end secured to the radial arm and its other end secured to said adjusting device.

3. The combination of a drive shaft, a sleeve adapted to be rotated thereby and having a radial arm, a tongue on said arm provided with apertures, a pulley loosely mounted upon said sleeve, a coiled spring arranged to grip the pulley and having one of its ends secured in an aperture in the radial arm, an adjusting bolt extending through another aperture in said arm, and means for securing the free end of the spring to said bolt.

4. The combination of a drive shaft, a sleeve arranged to be rotated thereby and provided with a radial arm, a pulley loosely mounted on said sleeve and having an annular grooved flange, a coiled spring passing around said flange and resting in the groove therein, one end of the spring being secured to said radial arm, and an adjusting device mounted in said arm and secured to the opposite end of the spring.

5. The combination of a drive shaft, a hub secured thereto, a sleeve loosely mounted upon said hub and having a radially extending arm, a pulley loosely mounted upon said sleeve, a spring arranged to grip said pulley and having its ends secured to said arm, and means arranged between the head and the sleeve for causing the sleeve to move with the hub.

6. The combination of a drive shaft, a head secured thereto, a spring pressed pawl carried thereby, a sleeve loosely mounted upon said hub and having an outwardly extending radial arm and also having a plurality of inwardly projecting teeth adapted to be engaged on said pawl, a pulley loosely mounted upon said sleeve and provided with an annular flange, and a coiled spring passing around said flange and having its ends secured to said radial arm.

7. The combination of a drive shaft, a hub secured thereto, a spring pressed pawl carried thereby, a sleeve loosely mounted upon said hub and having an outwardly extending radial arm and also having a plurality of inwardly projecting teeth adapted to be engaged by said pawl, a pulley loosely mounted upon said sleeve and provided with an annular flange, a coiled spring passing around said flange and having one of its ends secured to the radial arm, and an adjusting means secured between the other end of the coiled spring and said radial arm.

8. The combination of a drive shaft, a hub secured thereto and having an annular flange, a sleeve loosely mounted upon said hub and provided with a radial arm, means extending from said sleeve and coöperating with said annular flange to prevent lateral movement of said sleeve upon the hub, means arranged between said sleeve and hub to operatively connect the same, a pulley mounted upon said sleeve and provided with an annular flange, and a coiled spring passing around said flange and having its ends connected with said arm.

In testimony whereof I have hereunto set my hand in presence of two subscribing witnesses.

ARNO A. EWALD.

Witnesses:
A. M. HILL,
W. E. BRISTOL.